(12) United States Patent
Dudar et al.

(10) Patent No.: US 10,406,912 B2
(45) Date of Patent: Sep. 10, 2019

(54) SYSTEMS AND METHODS FOR EVAPORATIVE EMISSIONS LEAK TESTING

(71) Applicant: Ford Global Technologies, LLC, Dearbron, MI (US)

(72) Inventors: Aed M. Dudar, Canton, MI (US); Dennis Seung-Man Yang, Canton, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 867 days.

(21) Appl. No.: 14/602,117

(22) Filed: Jan. 21, 2015

(65) Prior Publication Data

US 2016/0209292 A1    Jul. 21, 2016

(51) Int. Cl.
*B60K 15/03* (2006.01)
*F02M 25/08* (2006.01)
*B60K 15/035* (2006.01)

(52) U.S. Cl.
CPC ........ *B60K 15/03* (2013.01); *B60K 15/03519* (2013.01); *F02M 25/0836* (2013.01); *B60K 2015/03243* (2013.01); *B60K 2015/03296* (2013.01); *B60K 2015/03302* (2013.01); *B60K 2015/03514* (2013.01)

(58) Field of Classification Search
CPC ........... F02M 25/0854; F02M 25/0836; F02M 25/0809; F02M 25/089; F02D 19/025; F02D 2041/223; F02D 2041/224; F02D 35/0015; G01L 27/007; B60K 15/03; B60K 15/03519; B60K 2015/03514; B60K 2015/03243; B60K 2015/03296
See application file for complete search history.

(56) References Cited

U.S. PATENT DOCUMENTS

| 4,471,806 | A | * | 9/1984 | Strock | B65D 90/50 137/460 |
| 5,001,924 | A | * | 3/1991 | Walter | B64G 1/402 73/149 |
| 5,474,050 | A | | 12/1995 | Cook et al. | |
| 5,794,597 | A | * | 8/1998 | Schwegler | B60K 15/077 123/463 |
| 6,523,398 | B1 | * | 2/2003 | Hanai | F02M 25/0809 73/114.39 |
| 6,626,157 | B2 | | 9/2003 | Perry | |

(Continued)

OTHER PUBLICATIONS

Anonymous, "Engine Off Key Off Memory to Engine of Key on Comparison for Nircos Fuel Tank Leak Detection for Tier III Evaporative Emissions Regulations," IPCOM No. 000232322, Published Oct. 31, 2013, 2 pages.

*Primary Examiner* — Randy W Gibson
*Assistant Examiner* — Gedeon M Kidanu
(74) *Attorney, Agent, or Firm* — Julia Voutyras; McCoy Russell LLP

(57) ABSTRACT

A method for a fuel system is provided, comprising adjusting a volume of a sealed fuel tank while maintaining spatial compartmentalization of bulk fuel within the sealed fuel tank, and indicating degradation of the sealed fuel tank based on a change in fuel tank pressure. In this way, the fuel tank may be tested for leaks without being unsealed, and without engaging the fuel pump or other elements of the fuel delivery system.

14 Claims, 6 Drawing Sheets

(56) References Cited

U.S. PATENT DOCUMENTS

| | | | | |
|---|---|---|---|---|
| 7,347,089 B1* | 3/2008 | Kelley | G01F 17/00 | |
| | | | 73/149 | |
| 7,810,475 B2* | 10/2010 | Peters | F02M 25/089 | |
| | | | 123/519 | |
| 7,856,965 B2 | 12/2010 | Crisan | | |
| 7,900,608 B2* | 3/2011 | Peters | F02M 25/089 | |
| | | | 123/518 | |
| 8,074,627 B2 | 12/2011 | Siddiqui | | |
| 8,312,765 B2* | 11/2012 | Pursifull | F02M 25/0836 | |
| | | | 73/114.39 | |
| 8,336,526 B1* | 12/2012 | Martin | F02M 25/0809 | |
| | | | 123/518 | |
| 8,725,347 B2* | 5/2014 | Jentz | G01M 3/025 | |
| | | | 180/441 | |
| 8,753,424 B2* | 6/2014 | Dudar | F02M 25/0818 | |
| | | | 123/516 | |
| 8,776,585 B2* | 7/2014 | Pursifull | F02M 25/0836 | |
| | | | 73/114.39 | |
| 9,103,246 B2* | 8/2015 | Pursifull | B60T 17/02 | |
| 9,422,900 B2* | 8/2016 | Pursifull | F02D 19/0613 | |
| 2003/0000290 A1* | 1/2003 | Weldon | F02M 25/0818 | |
| | | | 73/49.7 | |
| 2004/0226545 A1* | 11/2004 | Veinotte | B67D 7/048 | |
| | | | 123/520 | |
| 2005/0164058 A1* | 7/2005 | Lee | H01M 8/04089 | |
| | | | 429/423 | |
| 2006/0081224 A1* | 4/2006 | Spink | B60K 15/03519 | |
| | | | 123/519 | |
| 2011/0011264 A1* | 1/2011 | Makino | B01D 53/0415 | |
| | | | 96/6 | |
| 2011/0162625 A1* | 7/2011 | Espinoza | F02M 25/08 | |
| | | | 123/521 | |
| 2011/0166765 A1* | 7/2011 | DeBastos | B60K 15/03504 | |
| | | | 701/102 | |
| 2011/0168140 A1* | 7/2011 | DeBastos | F02M 25/08 | |
| | | | 123/521 | |
| 2011/0265768 A1* | 11/2011 | Kerns | F02M 25/08 | |
| | | | 123/521 | |
| 2011/0295482 A1* | 12/2011 | Pearce | B60K 15/03504 | |
| | | | 701/102 | |
| 2012/0211087 A1* | 8/2012 | Dudar | F02D 41/0032 | |
| | | | 137/12 | |
| 2012/0215399 A1* | 8/2012 | Jentz | G01M 3/025 | |
| | | | 701/32.8 | |
| 2012/0227580 A1* | 9/2012 | Dudar | F02M 25/0818 | |
| | | | 95/19 | |
| 2013/0032127 A1* | 2/2013 | Jentz | F02N 11/003 | |
| | | | 123/520 | |
| 2013/0112176 A1* | 5/2013 | Peters | F02M 25/0809 | |
| | | | 123/521 | |
| 2015/0142293 A1* | 5/2015 | Dudar | G01M 15/05 | |
| | | | 701/101 | |
| 2017/0087980 A1* | 3/2017 | Arras | F02M 25/0836 | |

* cited by examiner

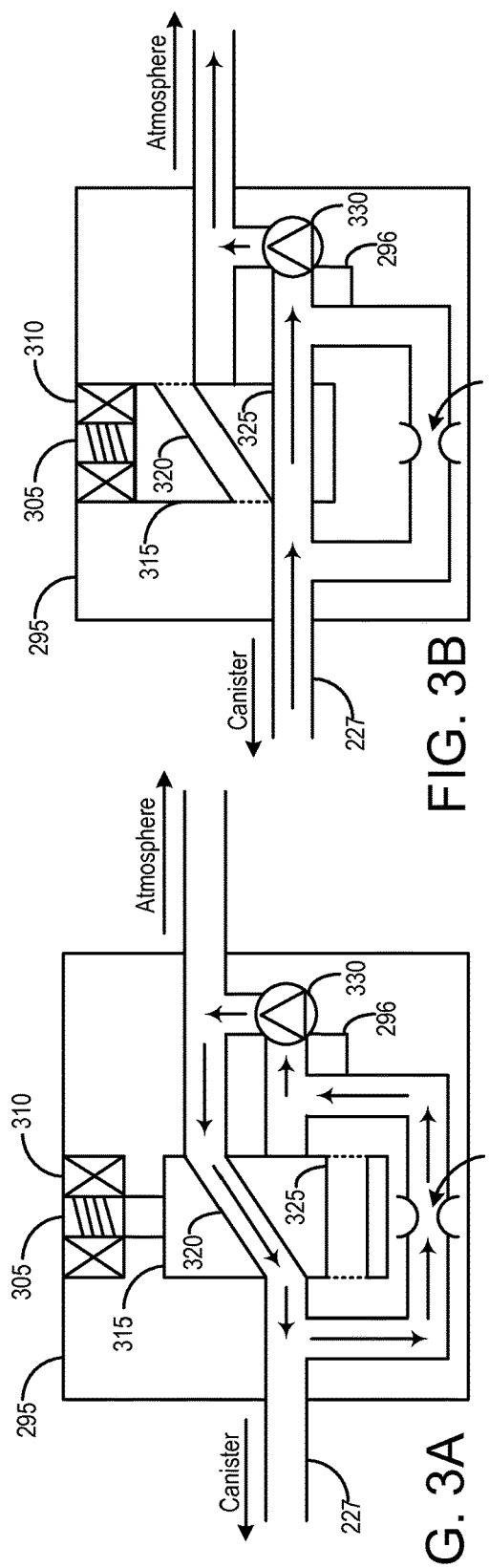
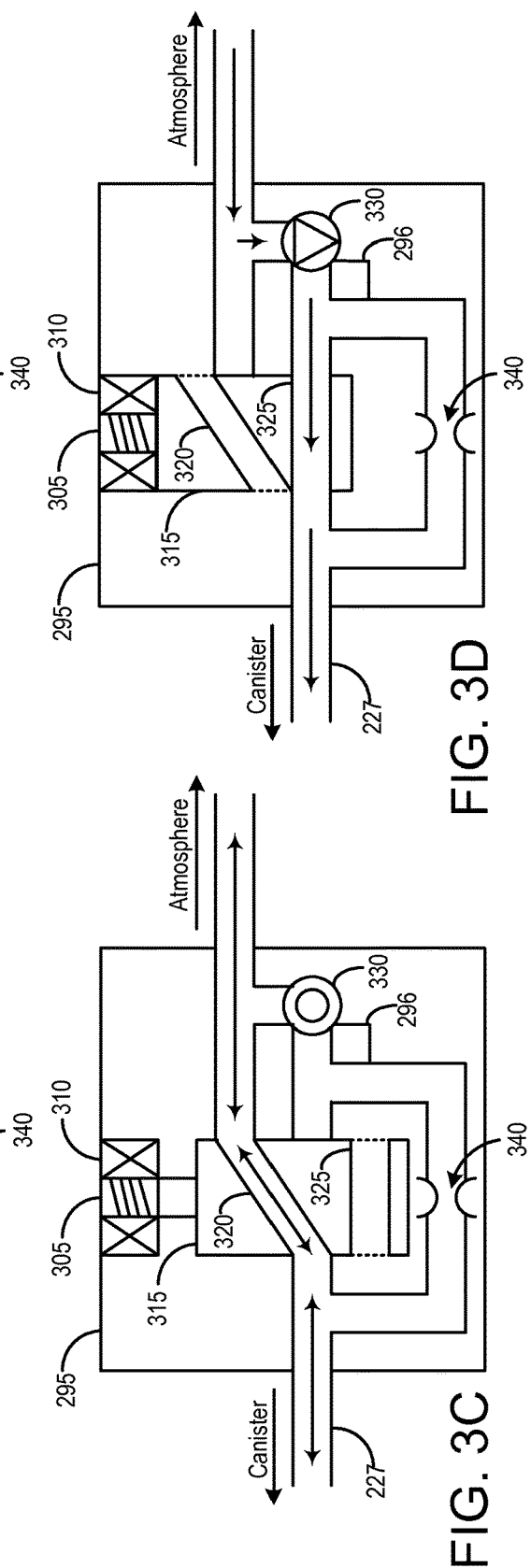

SYSTEMS AND METHODS FOR EVAPORATIVE EMISSIONS LEAK TESTING

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere. In a typical leak test, a vacuum is applied to the fuel system. The integrity of the system is determined by monitoring the decay of the applied vacuum or by comparing the resulting fuel system pressure to an expected pressure. The vacuum source may be the intake manifold of the vehicle engine.

In some vehicles, such as hybrid electric vehicles, the vehicle engine may not run frequently, or may not generate enough vacuum to conduct a leak test. Such vehicles are required to have an evaporative leak check module (ELCM) coupled to the fuel system. The ELCM includes a vacuum pump that can be coupled to the fuel system for leak testing. When applying a vacuum to the fuel tank, fuel vapors may be drawn into the fuel vapor canister. Again, the limited engine run time may limit opportunities to purge the fuel vapor canister to intake. In particular, if the leak check is performed following a key-off event, the loaded fuel vapor canister may soak over a diurnal cycle, increasing bleed emissions.

One example approach, shown in U.S. Pat. No. 8,074,627, includes removing fuel from a sealed fuel tank to an accumulator, thereby decreasing the volume of fuel in the fuel tank and decreasing the vapor pressure there within. However, this requires operation of the fuel pump, adding additional wear to an essential component of vehicle operation. Further, this adds additional components and complexity to the fuel delivery system, increasing both manufacturing costs and the likelihood of a malfunction within the system.

The inventors herein have recognized the above problems, and have developed systems and methods to at least partially address them. In one example, a method for a fuel system is provided, comprising adjusting a volume of a sealed fuel tank while maintaining spatial compartmentalization of bulk fuel within the sealed fuel tank, and indicating degradation of the sealed fuel tank based on a change in fuel tank pressure. In this way, the fuel tank may be tested for leaks without being unsealed, and without engaging the fuel pump or other elements of the fuel delivery system.

In another example, a fuel system for a vehicle is provided, comprising a fuel tank sealable via closing a fuel tank isolation valve coupled between the fuel tank and a fuel vapor canister, and a diaphragm valve coupled between the fuel tank and the fuel vapor canister. In this way, the fuel tank pressure may be adjusted via the diaphragm valve, and without venting fuel vapor to the fuel vapor canister during leak testing, thereby eliminating potential bleed emissions.

In yet another example, a method for a fuel system, comprising applying a vacuum to a fuel vapor canister side of the fuel system while maintaining a fuel tank isolation valve closed, and indicating degradation of a fuel tank based on a change of fuel tank pressure. In this way, the fuel vapor canister will not be loaded during leak testing, enabling the installation of smaller canisters.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows an example vehicle system with a fuel system and an emissions control system.

FIG. 3A shows a schematic depiction of an evaporative leak check module in a configuration to perform a reference check.

FIG. 3B shows a schematic depiction of an evaporative leak check module in a configuration to perform a fuel system evacuation leak check.

FIG. 3C shows a schematic depiction of an evaporative leak check module in a configuration to perform a purge operation.

FIG. 3D shows a schematic depiction of an evaporative leak check module in a configuration to perform a passive purge operation.

DETAILED DESCRIPTION

Figure 1:
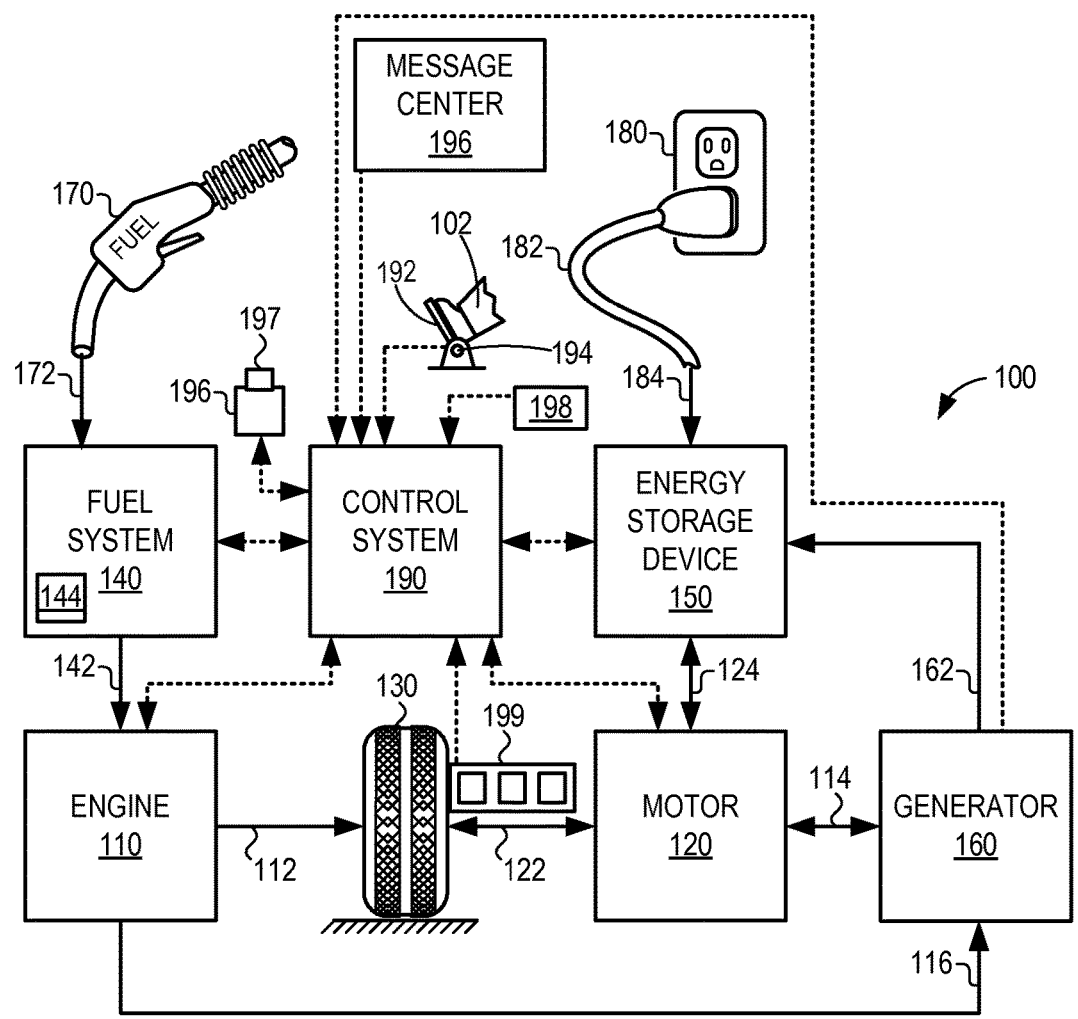
Figure 2:
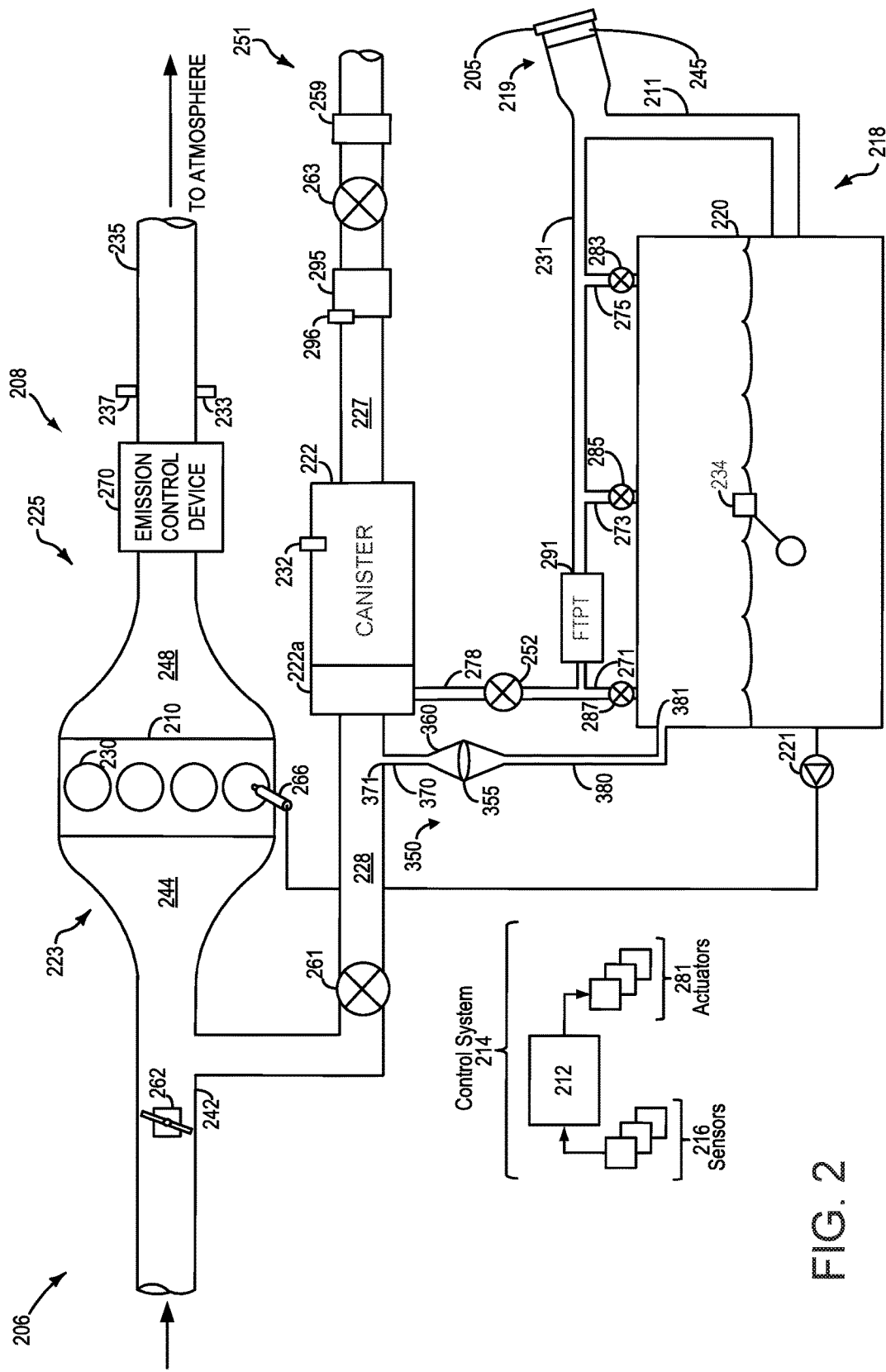
Figure 4:
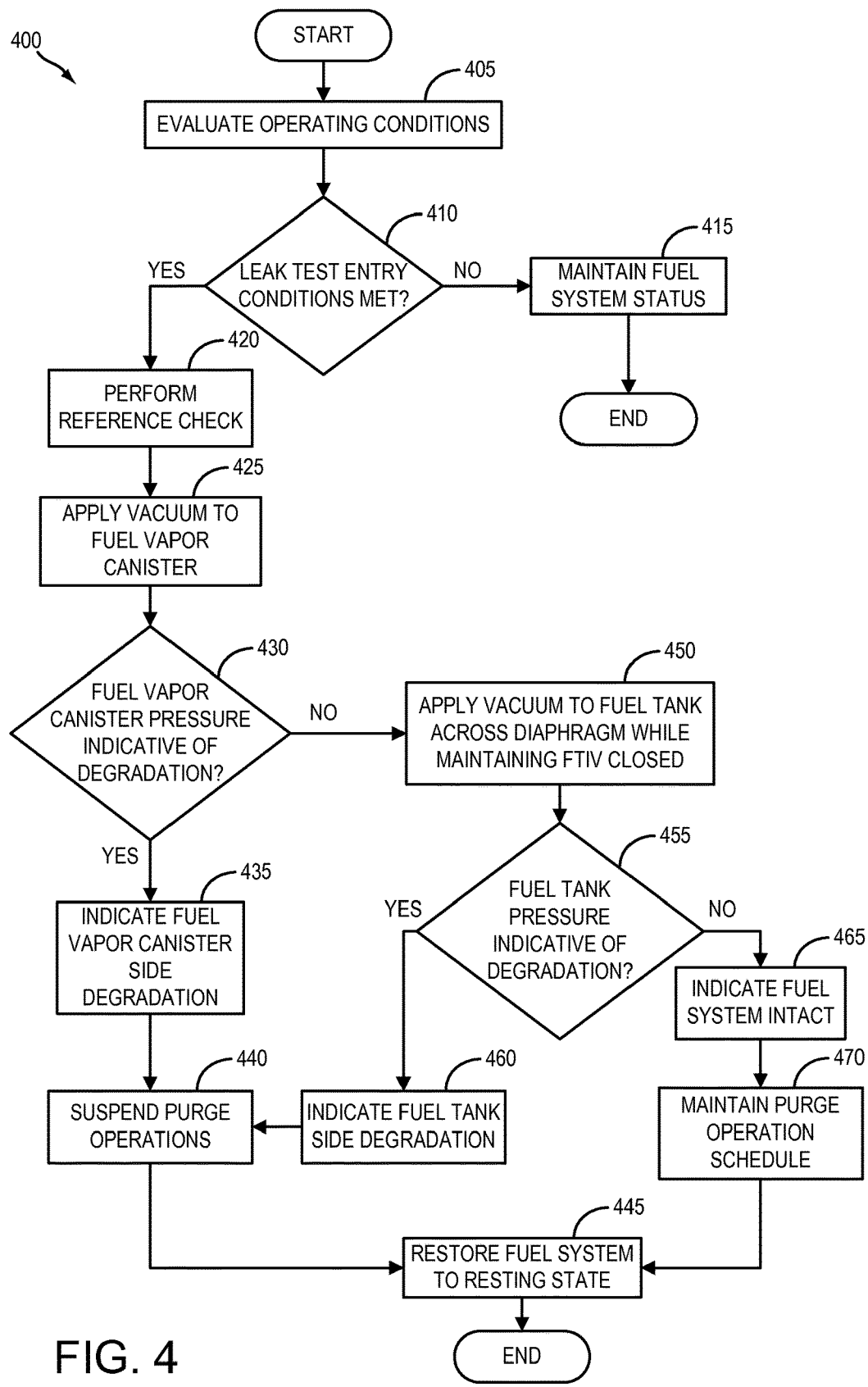
FIG. 4 shows a flow chart for an example high level method for evaporative emissions leak testing.
Figure 5A:
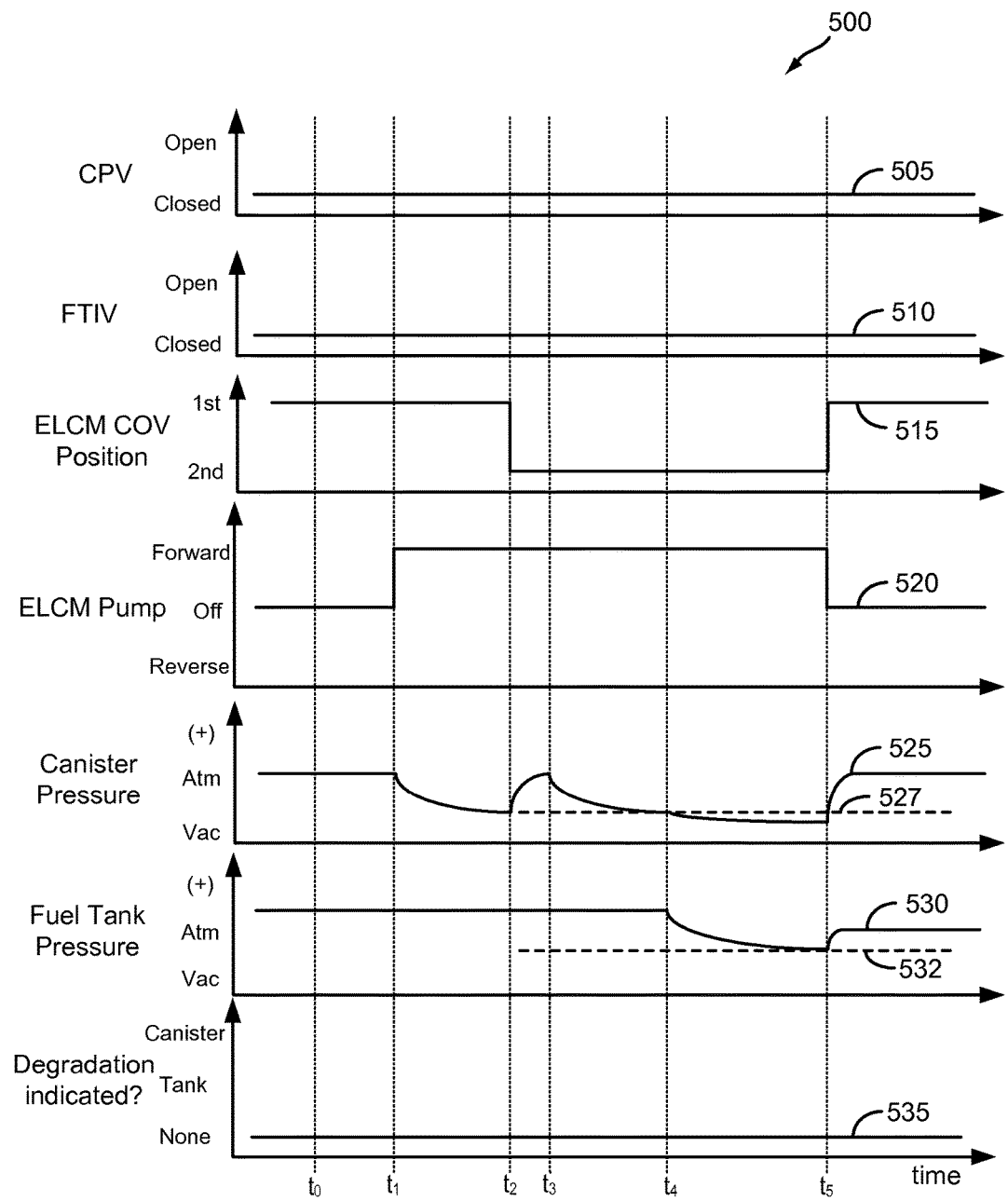
FIG. 5A shows an example timeline for an evaporative emissions leak test on an intact emissions control system.
Figure 5B:
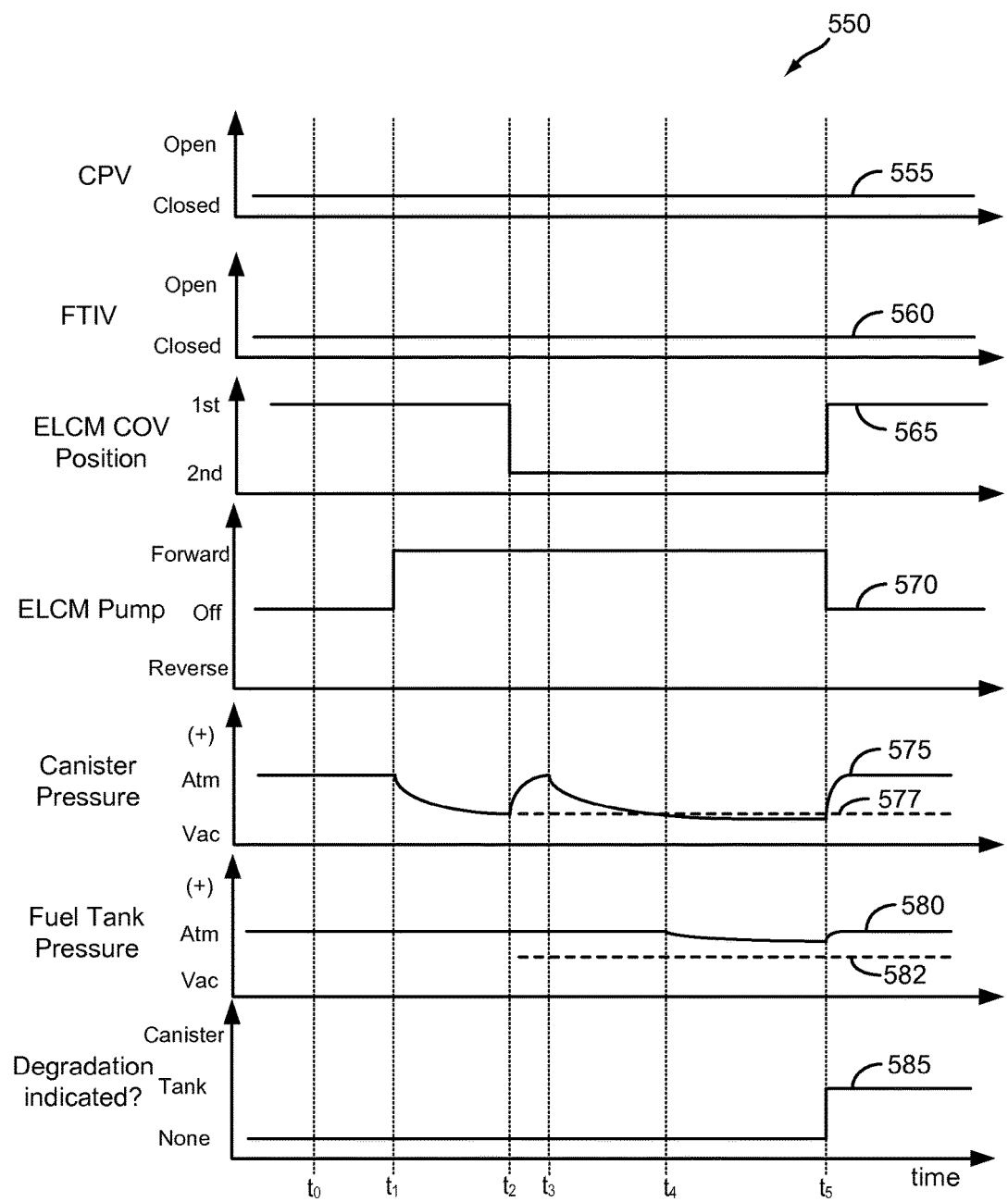
FIG. 5B shows an example timeline for an evaporative emissions leak test on a degraded emissions control system.

This detailed description relates to systems and methods for leak testing a fuel system coupled to an engine. The fuel system and engine system may be included in a hybrid vehicle, such as a plug-in electric hybrid vehicle, as depicted in FIG. 1. Hybrid vehicles may be required to include an evaporative leak check module (ELCM) to perform periodic leak tests on the included fuel system. The ELCM may be placed in a vent between the fuel vapor canister and atmosphere, as shown in FIG. 2. The ELCM may be configured to adapt multiple conformations, such as the conformations shown in FIGS. 3A-3D. The fuel tank and ELCM may be coupled via a diaphragm valve, as shown in FIG. 2. The diaphragm valve may deflect based on a pressure gradient, allowing the ELCM to change the pressure within the fuel tank without opening a fuel tank isolation valve, thus maintaining fuel vapor in the fuel tank during leak testing. A method for leak testing such a system is shown in FIG. 4. FIG. 5A shows an example timeline for an ELCM-based leak test on an intact emissions control system using the method of FIG. 4, while FIG. 5B shows an example timeline for an ELCM-based leak test on emissions control system comprising a fuel tank leak using the method of FIG. 4.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 263 coupled within vent line 227. When included, the canister vent valve 263 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 4.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

FIGS. 3A-3D show a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold leak to be tested, for example, 0.02". In either the first or second position, pressure sensor 296 may generate a pressure signal reflecting the pressure within ELCM 295. Operation of pump 330 and solenoid 310 may be controlled via signals received from controller 212.

As shown in FIG. 3A, COV 315 is in the first position, and pump 330 is activated in a first direction. Fuel tank isolation valve 252 (not shown) is closed, isolating ELCM 295 from the fuel tank. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for passing/failing a subsequent leak test.

As shown in FIG. 3B, COV 315 is in the second position, and pump 330 is activated in the first direction. This configuration allows pump 330 to draw a vacuum on fuel system 18. In examples where fuel system 18 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of a leak in the system should allow for the vacuum level in ELCM 295 to reach or exceed the previously determined vacuum threshold. In the presence of a leak larger than the reference orifice, the pump will not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example.

As shown in FIG. 3D, COV 315 is in the second position, and pump 330 is activated in a second direction, opposite from the first direction. In this configuration, pump 330 may pull air from atmosphere into fuel system 218. In a configuration where FTIV 252 is open and CPV 261 is closed, air drawn by pump 330 may promote desorption of fuel vapor from canister 222, and further direct the desorbed fuel vapor into fuel tank 220. In this way, fuel vapor may be purged from the canister to the fuel tank, thereby decreasing the potential for bleed emissions.

While the ELCM allows for evaporative emissions leak testing without relying on the engine as a source of vacuum, testing the fuel tank may result in the loading of the fuel vapor canister with fuel vapor. This, in turn, may lead to an increase in bleed emissions, as the limited engine run time may also limit the opportunities to purge the fuel vapor canister to intake. In order to evacuate the fuel tank, the FTIV must be opened, coupling the fuel tank to the fuel vapor canister. As the ELCM pump draws a vacuum on the fuel tank, any fuel vapors in the tank will be drawn into the fuel vapor canister.

Returning to FIG. 2, emissions control system 251 includes a diaphragm valve 350 coupled between ELCM 295 and fuel tank 220. Diaphragm valve 350 comprises a flexible diaphragm 355 positioned within a deflection volume 360. In this configuration, as the ELCM evacuates the canister side of the emissions control system while maintaining FTIV 252 closed, diaphragm 355 may deflect outwards from fuel tank 220, thereby increasing a volume of the fuel tank (e.g., the tank vapor dome volume). As the tank vapor dome volume increases, the tank pressure should decrease, according to the ideal gas law. The change in pressure may be detected by FTPT 291. A pressure decrease above a threshold may indicate an intact fuel tank. In this way, the integrity of the fuel tank may be evaluated without loading the fuel vapor canister. If the fuel tank is degraded, a pressure decrease may not develop within the fuel tank. In configurations where the ELCM pump is reversible, the ELCM may pressurize the canister side of the emissions control system. Diaphragm 355 may thus deflect inwards towards fuel tank 220, thereby decreasing the vapor dome volume. As the tank vapor dome volume decreases, the tank pressure should increase accordingly. In scenarios where there is a pressure differential between the fuel tank and the canister side of the emissions control system, diaphragm 355 may be deflected prior to the application of vacuum or pressure from the ELCM pump. For example, if a fuel tank vacuum exists, the diaphragm may be deflected inwards towards the fuel tank. Application of a vacuum may then cause the diaphragm to deflect outwards from this position, but may not deflect past the equilibrium point. If a positive fuel tank pressure exists, the diaphragm may be deflected outwards from the fuel tank. Application of a vacuum may then cause the diaphragm to deflect further outwards. If the diaphragm is deflected to a threshold amount (e.g., a threshold pressure or vacuum exists within the fuel tank), the fuel tank may be considered to be intact, and no further manipulation of the fuel tank volume may be necessary to determine the fuel tank status. In some examples, the controller may selectively apply a vacuum or positive pressure to the diaphragm based on the fuel tank pressure. For example, if applying a vacuum is unlikely to significantly change the fuel tank volume, or if a threshold amount of battery charge is needed to significantly change the fuel tank volume, the controller may instead command the ELCM pump to apply a positive pressure to the diaphragm.

In this configuration, deflection volume 360 is coupled to the fuel tank via conduit 370, merging at junction 371. Further, deflection volume 360 is coupled to the ELCM via conduit 380, merging with purge line 228 at junction 381. However, in other configurations junction 381 may couple the ELCM to the fuel tank at vent line 227. In examples where vent line 227 includes a canister vent valve between ELCM 295 and atmosphere, junction 381 may be located on the atmospheric side of ELCM 295. In some examples, a controlling valve may be coupled within conduit 370 and/or conduit 380. The controlling valve may be an active valve (e.g. a solenoid valve) which may be a default-closed valve. During an evaporative emissions leak test, the canister side may be evacuated first; then the controlling valve may be opened, thus coupling the diaphragm to the ELCM. In this way, the canister side and the fuel tank side may be tested completely independent of one another. In some examples, where the controlling valve is located within conduit 380, the controlling valve may be a passive valve that opens responsive to a threshold pressure. For example, the controlling valve may be configured to open responsive to a vacuum corresponding to a threshold pressure indicative that the canister side of the emissions control system is intact.

The size and configuration of the deflection volume and diaphragm may be based on available space within the vehicle system. For example, the diaphragm valve may be configured such that the diaphragm is relatively wide and has a relatively small deflection distance, or may be configured such that the diaphragm is relatively narrow and has a relatively large deflection distance. In some examples, the diaphragm may be biased such that it only deflects in one direction (e.g., outwards from the fuel tank) and is relatively inflexible in the other direction (e.g. inwards towards the fuel tank).

The vacuum applied to the diaphragm may originate from a source other than the ELCM vacuum pump. For example, engine intake vacuum may be used to evacuate the emissions control system in examples where a canister vent valve is included. The CPV may be opened while the CVV and FTIV are closed. The engine intake vacuum may thus evacuate the canister side of the emissions control system. Degradation may be indicated based on changes in pressure measured at the canister, such as with pressure sensor 296. A decrease in fuel tank pressure would then indicate that the fuel tank is intact, assuming that the FTIV has been indicated to be intact. In this way, the amount of fuel vapor entering the engine during a leak test may be limited. Further, this allows for engine intake vacuum to be generated through unfueled spinning of the engine and applied to the emissions control system without drawing fuel tank vapor to intake.

By applying a pressure differential across the diaphragm, it is possible to change the tank vapor dome volume without changing the spatial compartmentalization of the bulk fuel stored within the fuel tank. In other words, fuel may not be moved from one compartment to another compartment within the fuel tank in order to adjust the pressure seen by the fuel tank pressure sensor. Further, fuel may not be added to or removed from the fuel tank in order to adjust the vapor pressure. Fuel pumps may not be operated during evaporative emissions leak testing. The fuel tank vapor dome volume may be adjusted by applying an external pressure or vacuum to a flexible partition coupled to the fuel tank.

FIG. 4 shows a flow chart for an example high-level method 400 for performing an evaporative emissions leak test. Method 400 will be described with regards to the systems described herein and depicted in FIGS. 1, 2, and 3A-3D, but it should be understood that similar methods may be applied to other systems without departing from the scope of this disclosure. Method 400 may be stored as instructions stored in non-transitory memory, and carried out by a controller, such as controller 212.

Method 400 may begin at 405 by estimating operating conditions. Operating conditions may include ambient conditions, such as temperature, humidity, and barometric pressure, as well as vehicle conditions, such as engine operating status, fuel level, fuel tank pressure, fuel vapor canister load status, etc. Continuing at 410, method 400 may include determining whether the entry conditions are met for an ELCM-based leak test. For example, entry conditions may include an engine-off condition, and/or an elapsed duration or number of engine-off events following a previous ELCM-based fuel system leak test. If entry conditions are not met, method 400 may proceed to 415. At 415, method 400 may include maintaining the status of the vehicle fuel system. A flag may be set at controller 212 to follow up at a subsequent key-off event, and/or when operating conditions favor a leak test. Method 400 may then end.

If entry conditions for a leak test are met, method 400 may proceed to 420. At 420, method 400 may include performing an ELCM reference check. As discussed herein with regards to FIG. 3A, an ELCM reference check may comprise placing COV 315 in a first position and activating ELCM vacuum pump 330 in a first (forward) direction. A pressure sensor, such as pressure sensor 296 may record the resulting vacuum level in the ELCM, after a certain amount of time, or when the vacuum level has reached a plateau. The recorded vacuum level at the end of the reference check may be used as a basis for one or more thresholds to signify the expected vacuum attainable for a systemic leak with a diameter equivalent to the reference orifice. In some examples, the reference orifice has a diameter of 0.02", but may be smaller or greater in diameter in some embodiments. A first (vacuum) threshold may be determined for the canister side of the emissions control system for a configuration where the FTIV and CPV are closed. A second threshold may be determined for the fuel tank based on applying a vacuum across diaphragm valve 350. The second threshold may be based on the current fuel tank pressure, fuel fill level, fuel type, etc. and may represent a decrease in fuel tank pressure from the current fuel tank pressure. However, as described above and with regards to FIGS. 2 and 3D, in examples where the ELCM pump is reversible, positive pressure may be used to test the fuel vapor canister and/or the fuel tank. In such examples, the first threshold may be a positive pressure threshold, and the second threshold may represent an increase in fuel tank pressure from the current fuel tank pressure.

Continuing at 425, method 400 may include applying a vacuum to the fuel vapor canister. As discussed herein with regards to FIG. 3B, applying a vacuum to the fuel vapor canister may comprise opening a canister vent valve, closing (or maintaining closed) CPV 261, placing COV 315 in a second position, maintaining FTIV 252 closed, and maintaining ELCM vacuum pump 330 on in the first (forward) direction. In this configuration, as pump 330 pulls a vacuum on fuel tank 220, the absence of a leak in the system should allow for the vacuum level in ELCM 295 to reach or exceed the previously determined vacuum threshold. In the presence of a leak larger than the reference orifice, the pump will not pull down to the reference check vacuum level. The pull down may be executed until the reference vacuum is met, for a time period that is predetermined, or for a time period based on current conditions. Continuing at 430, method 400 may include determining whether the resultant fuel vapor canister pressure is indicative of degradation (e.g., whether the vacuum threshold has been met). If the fuel vapor canister pressure is indicative of degradation, method 400 may proceed to 435. At 435, method 400 may include indicating fuel vapor canister side degradation. Indicating fuel vapor canister side degradation may include recording the occurrence of a failing test result, and may further include illuminating an MIL. Continuing at 440, method 400 may include suspending purge operations. For example, scheduled purge operations may be suspended until the degradation is addressed. Other mitigating action may be taken by the controller, such as maintaining the FTIV closed to prevent fuel vapor escape. Continuing at 445, method 400 may include restoring the fuel system to a resting state. Restoring the fuel system to a resting state may include turning off ELCM pump 330, and placing COV 315 in a first position. Method 400 may then end.

Returning to 430, if the fuel vapor canister side pressure is not indicative of degradation (e.g., threshold vacuum is met or exceeded), method 400 may proceed to 450. At 450, method 400 may include applying a vacuum to the fuel tank across the diaphragm valve while maintaining the FTIV closed. As applied to the system shown in FIG. 2, applying a vacuum to the fuel tank across the diaphragm includes maintaining ELCM pump 330 on in the first (forward) direction, and maintaining COV 315 in the second position. In examples where vent line 227 includes a canister vent valve between ELCM 295 and atmosphere, and wherein junction 381 is located on the atmospheric side of ELCM 295, the canister vent valve may be closed (or maintained closed). In examples where an active controlling valve is coupled within conduit 370 and/or conduit 380, the controlling valve may be opened. As described with regards to FIG. 2, in this conformation, as pump 330 pulls a vacuum on diaphragm 355, the volume of the fuel tank vapor dome increases. The absence of a leak in the fuel tank should allow for the fuel tank pressure to decrease to the previously determined fuel tank pressure threshold, while the canister side vacuum is maintained or decreases. In the presence of a leak larger than the reference orifice, the fuel tank pressure will not decrease to the threshold. The pull down may be executed until the threshold pressure is met, for a duration that is predetermined, or for a duration based on current conditions.

Continuing at 455, method 400 may include determining whether the resultant fuel tank pressure is indicative of degradation (e.g., whether the pressure threshold has been met). If the fuel tank pressure is indicative of degradation, method 400 may proceed to 460. At 460, method 400 may include indicating fuel tank side degradation. Indicating fuel tank side degradation may include recording the occurrence of a failing test result, and may further include illuminating an MIL. Continuing at 440, method 400 may include suspending purge operations. For example, scheduled purge operations may be suspended until the degradation is addressed. Other mitigating action may be taken by the controller, such as suspending refueling operations. Continuing at 445, method 400 may include restoring the fuel system to a resting state. Restoring the fuel system to a resting state may include turning off ELCM pump 330, and placing COV 315 in a first position. Restoring the fuel system may further include opening a canister vent valve (if closed), and closing a controlling valve (if open). Method 400 may then end.

Returning to 455, if the fuel tank pressure is not indicative of degradation, method 400 may proceed to 465. At 465, method 400 may include indicating that the fuel system is intact. Indicating the fuel system is intact may include recording the passing test result. Continuing at 470, method 400 may include maintaining the purge operation schedule. Method 400 may then end.

FIG. 5A shows an example timeline 500 for a leak test on an intact emissions control system utilizing an ELCM in a plug-in hybrid vehicle equipped with a diaphragm valve coupled between the ELCM and the fuel tank, using the method described herein and with regards to FIG. 4 as applied to the system described herein and with regards to FIGS. 1, 2, and 3A-D. Timeline 500 includes plot 505 indicating status of a canister purge valve (CPV) over time. Timeline 500 further includes plot 510 indicating the status of a fuel tank isolation valve (FTIV) over time. Timeline 500 further includes plot 515, indicating the status of an ELCM changeover valve over time; plot 520, indicating the status of an ELCM vacuum pump over time; plot 525, indicating a fuel vapor canister pressure over time; plot 530, indicating pressure in a fuel tank over time; and plot 535, showing whether degradation is indicated over time. Line 527 represents a canister vacuum threshold for a 0.02" leak based on an ELCM reference check. Line 532 represents a fuel tank pressure threshold for a 0.02" leak based on an ELCM reference check.

At time $t_0$, the fuel system is in a resting state. As such, the CPV is closed, as shown by plot 505. The FTIV is closed, as shown by plot 510. The ELCM COV is in the $1^{st}$ position, as shown by plot 515, and the ELCM pump is off, as shown by plot 520. At time $t_1$, entry conditions for a leak test are met. Accordingly, the ELCM pump is turned on in a first (forward) direction, while the ELCM COV is maintained in the first position. As discussed herein and with regard to FIG. 3A, in this conformation, the ELCM may perform a reference check that compensates for humidity, temperature, and barometric pressure.

The reference check proceeds from time $t_1$ to time $t_2$. With the FTIV in the closed conformation, the fuel tank pressure is maintained, as indicated by plot 530. The canister side pressure decreases, as measured by the ELCM pressure sensor. At time $t_2$, the reference check is completed. A threshold vacuum are set for leak testing the fuel vapor canister side of the fuel system (line 527) and a threshold pressure change is set for the fuel tank (line 532). The fuel system may then be placed in conformation for leak testing the fuel vapor canister side. The CPV and FTIV are maintained closed. The ELCM COV is placed in the $2^{nd}$ position, as indicated by plot 515. As described herein and with regards to FIG. 3B, in this conformation, the ELCM vacuum pump may draw a vacuum on the fuel vapor canister. Placing the ELCM COV in the $2^{nd}$ position couples the pressure sensor to atmosphere. Accordingly the canister pressure returns to atmospheric pressure at time $t_3$. A vacuum is drawn on the fuel vapor canister from time $t_3$ to time $t_4$, when the fuel vapor canister vacuum indicated by plot 525 reaches threshold 527. Accordingly, no degradation is indicated, as shown by plot 535.

At time $t_4$, the canister side vacuum causes the diaphragm to deflect outwards from the fuel tank. Accordingly, the fuel tank pressure decreases, as the fuel tank vapor dome volume is increased. At time $t_5$, the fuel tank pressure reaches the fuel tank pressure threshold indicated by line 532. Accordingly, no degradation is indicated. The fuel system is then returned to a resting state. The ELCM COV is placed in the $1^{st}$ position, and the ELCM pump is turned off.

FIG. 5B shows an example timeline 550 for a leak test on an emissions control system comprising a fuel tank leak utilizing an ELCM in a plug-in hybrid vehicle equipped with a diaphragm valve coupled between the ELCM and the fuel tank, using the method described herein and with regards to FIG. 4 as applied to the system described herein and with regards to FIGS. 1, 2, and 3A-D. Timeline 550 includes plot 555 indicating status of a canister purge valve (CPV) over time. Timeline 550 further includes plot 560 indicating the status of a fuel tank isolation valve (FTIV) over time. Timeline 550 further includes plot 565, indicating the status of an ELCM changeover valve over time; plot 570, indicating the status of an ELCM vacuum pump over time; plot 575, indicating a fuel vapor canister pressure over time; plot 580, indicating pressure in a fuel tank over time; and plot 585, showing whether degradation is indicated over time. Line 577 represents a canister vacuum threshold for a 0.02" leak based on an ELCM reference check. Line 582 represents a fuel tank pressure threshold for a 0.02" leak based on an ELCM reference check.

At time $t_0$, the fuel system is in a resting state. As such, the CPV is closed, as shown by plot 555. The FTIV is closed, as shown by plot 560. The ELCM COV is in the $1^{st}$ position, as shown by plot 565, and the ELCM pump is off, as shown by plot 570. At time $t_1$, entry conditions for a leak test are met. Accordingly, the ELCM pump is turned on in a first (forward) direction, while the ELCM COV is maintained in the first position. As discussed herein and with regard to FIG. 3A, in this conformation, the ELCM may perform a reference check that compensates for humidity, temperature, and barometric pressure.

The reference check proceeds from time $t_1$ to time $t_2$. With the FTIV in the closed conformation, the fuel tank pressure is maintained, as indicated by plot 580. The canister side pressure decreases, as measured by the ELCM pressure sensor. At time $t_2$, the reference check is completed. A threshold vacuum are set for leak testing the fuel vapor canister side of the fuel system (line 577) and a threshold pressure change is set for the fuel tank (line 582). The fuel system may then be placed in conformation for leak testing the fuel vapor canister side. The CPV and FTIV are maintained closed. The ELCM COV is placed in the $2^{nd}$ position, as indicated by plot 565. As described herein and with regards to FIG. 3B, in this conformation, the ELCM vacuum pump may draw a vacuum on the fuel vapor canister. Placing the ELCM COV in the $2^{nd}$ position couples the pressure sensor to atmosphere. Accordingly the canister pressure returns to atmospheric pressure at time $t_3$. A vacuum is drawn on the fuel vapor canister from time $t_3$ to time $t_4$, when the fuel vapor canister vacuum indicated by plot 575 reaches threshold 577. Accordingly, no degradation is indicated, as shown by plot 585.

At time $t_4$, the canister side vacuum causes the diaphragm to deflect outwards from the fuel tank. Accordingly, the fuel tank pressure decreases, as the fuel tank vapor dome volume is increased. However, as the fuel tank is degraded, the rate of fuel tank pressure change is less than that shown at time $t_4$ in FIG. 5A. At time $t_5$, fuel tank leak test is concluded, as the fuel tank pressure has plateaued without reaching the threshold indicated by line 582. Accordingly, fuel tank degradation is indicated. The fuel system is then returned to a resting state. The ELCM COV is placed in the $1^{st}$ position, and the ELCM pump is turned off.

The systems described herein and depicted in FIGS. 1, 2, and 3A-3D, along with the method described herein and depicted in FIG. 4 may enable one or more systems and one or more methods. In one example, a method for a fuel system is provided, comprising adjusting a volume of a sealed fuel tank while maintaining spatial compartmentalization of bulk fuel within the sealed fuel tank, and indicating degradation of the sealed fuel tank based on a change in fuel tank pressure. In this way, the fuel tank may be tested for leaks without being unsealed, and without engaging the fuel pump or other elements of the fuel delivery system. In such an example, adjusting the volume of the sealed fuel tank may additionally or alternatively comprise applying a pressure gradient across a flexible diaphragm coupled to the sealed fuel tank. The flexible diaphragm may additionally or alternatively be configured to deflect according to the pressure gradient. In any of the preceding embodiments comprising a flexible diaphragm, applying a pressure gradient across the flexible diaphragm may additionally or alternatively comprise operating a vacuum pump fluidically coupled to the sealed fuel tank via the flexible diaphragm. In some examples, the vacuum pump may additionally or alternatively be fluidically coupled to a fuel vapor canister, the fuel vapor canister fluidically coupled to the fuel tank via a fuel tank isolation valve. In any of the preceding embodiments comprising a vacuum pump, the method may additionally or alternatively comprise operating the vacuum pump to apply a vacuum to the fuel vapor canister, and indicating degradation of the fuel vapor canister based on a pressure at the fuel vapor canister. In any of the preceding embodiments wherein a vacuum pump is operated to apply a pressure gradient across the flexible diaphragm, the method may additionally or alternatively comprise indicating the fuel system is intact responsive to a threshold decrease in fuel tank pressure. In any of the preceding embodiments comprising a flexible diaphragm, applying a pressure gradient across the flexible diaphragm may additionally or alternatively comprise applying a vacuum to the flexible diaphragm from a vacuum source external to the sealed fuel tank. In any of the preceding embodiments, the method may additionally or alternatively comprise suspending purge operations responsive to an indication of fuel tank degradation. The technical result of implementing this method is that the fuel tank may remain sealed during leak testing, thereby allowing for leak testing regardless of fuel vapor canister load. Further, the method does not require the use of the fuel pump or other elements of the fuel delivery system in order to create a pressure change within the fuel tank, thus saving unnecessary wear on these elements.

In another example, a fuel system for a vehicle is provided, comprising a fuel tank sealable via closing a fuel tank isolation valve coupled between the fuel tank and a fuel vapor canister, and a diaphragm valve coupled between the fuel tank and the fuel vapor canister. In such an example, the diaphragm valve may additionally or alternatively comprise: a flexible diaphragm positioned within a deflection volume, the flexible diaphragm configured to deflect within the deflection volume responsive to a pressure gradient applied across the flexible diaphragm, and wherein the diaphragm valve is coupled to the fuel tank via a first conduit at a first junction. The diaphragm valve may additionally or alternatively be coupled to a fuel vapor canister purge line via a second conduit at a second junction. In some examples, the fuel system may additionally or alternatively comprise a canister vent valve coupled within a fuel vapor canister vent line between the fuel vapor canister and atmosphere, and the diaphragm valve may be additionally or alternatively coupled to the fuel vapor canister vent line via a second conduit at a second junction. In any of the preceding embodiments comprising a flexible diaphragm, the fuel system may additionally or alternatively comprise a controlling valve configured to regulate the pressure gradient applied across the flexible diaphragm. In some examples, the controlling valve may additionally or alternatively be an actively controlled valve. In any of the preceding embodiments, a vacuum pump may additionally or alternatively be coupled to the fuel vapor canister. In embodiments where the vacuum pump is coupled to the fuel vapor canister, the fuel system may additionally or alternatively comprise a controller configured with instructions stored in non-transitory memory, that when executed, cause the controller to operate the vacuum pump to apply a vacuum to the diaphragm valve while maintaining the fuel tank isolation valve closed, and indicate degradation of the fuel tank based on a fuel tank pressure change. The technical result of implementing this system is that the fuel tank pressure may be adjusted via the diaphragm valve, without venting fuel vapor to the fuel vapor canister during leak testing. This may decrease potential bleed emissions, as the leak testing may have otherwise saturated the canister prior to a prolonged vehicle soak.

In yet another example, a method for a fuel system, comprising applying a vacuum to a fuel vapor canister side of the fuel system while maintaining a fuel tank isolation valve closed, and indicating degradation of a fuel tank based on a change of fuel tank pressure. In such an example, the fuel vapor canister side of the fuel system may additionally or alternatively be coupled to the fuel tank via a diaphragm valve. In such an example, the diaphragm valve may additionally or alternatively be configured to deflect outwards from the fuel tank responsive to a vacuum applied from the fuel vapor canister side of the fuel system, thereby increasing a volume of a fuel tank vapor dome. The technical result of implementing this method is that the fuel vapor canister will not be loaded during leak testing, enabling the installation of smaller canisters.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
adjusting a tank vapor dome volume of a sealed fuel tank while maintaining a volume of bulk fuel within the sealed fuel tank by applying a pressure gradient across a flexible diaphragm coupled to the sealed fuel tank, the pressure gradient applied by operating a vacuum pump coupled to the sealed fuel tank via the flexible diaphragm, the vacuum pump fluidically coupled to a fuel vapor canister, the fuel vapor canister fluidically coupled to the fuel tank via a fuel tank isolation valve;
closing the fuel tank isolation valve prior to operating the vacuum pump; and
indicating degradation of the sealed fuel tank based on a change in fuel tank pressure responsive to the adjusting of the tank vapor dome volume.

2. The method of claim 1, wherein the flexible diaphragm is configured to deflect according to the pressure gradient.

3. The method of claim 1, further comprising:
operating the vacuum pump to apply a vacuum to the fuel vapor canister; and
indicating degradation of the fuel vapor canister based on a pressure at the fuel vapor canister.

4. The method of claim 1, further comprising:
indicating the fuel system is intact responsive to a threshold decrease in fuel tank pressure.

5. The method of claim 1, further comprising:
suspending purge operations responsive to an indication of fuel tank degradation, and wherein adjusting the tank vapor dome volume of the sealed fuel tank comprises adjusting the tank vapor dome volume while a canister purge valve fluidically coupling the fuel tank to the fuel vapor canister is closed.

6. A fuel system for a vehicle, comprising:
a fuel tank sealable via closing a fuel tank isolation valve coupled between the fuel tank and a fuel vapor canister;
a diaphragm mechanism coupled between the fuel tank and the fuel vapor canister, the diaphragm mechanism comprising a flexible diaphragm positioned within a deflection volume, the flexible diaphragm configured to deflect within the deflection volume responsive to a pressure gradient applied across the flexible diaphragm while maintaining fuel vapor in the fuel tank; and
a controller configured with instructions stored in non-transitory memory that, when executed, cause the controller to:
apply a vacuum to the diaphragm mechanism to generate the pressure gradient across the flexible diaphragm while maintaining the fuel tank isolation valve closed and without venting fuel vapor from the fuel tank to the fuel vapor canister; and
indicate degradation of the fuel tank based on a fuel tank pressure change resulting from the application of the vacuum to the diaphragm mechanism.

7. The fuel system of claim 6, further comprising a vacuum pump coupled to the fuel vapor canister, and wherein the instructions, when executed, cause the controller to activate the vacuum pump to apply the vacuum to the diaphragm mechanism.

8. The fuel system of claim 7, further comprising the controller configured with instructions stored in non-transitory memory that, when executed, cause the controller to:
operate the vacuum pump to apply the vacuum to the diaphragm mechanism while maintaining the fuel tank isolation valve closed and without venting fuel vapor from the fuel tank to the fuel vapor canister; and indicate degradation of the fuel tank based on a fuel tank pressure change resulting from the application of the vacuum to the diaphragm mechanism.

9. The fuel system of claim 6, wherein the diaphragm mechanism is coupled to the fuel tank via a first conduit at a first junction.

10. The fuel system of claim 9, wherein the diaphragm mechanism is coupled to a fuel vapor canister purge line via a second conduit at a second junction.

11. The fuel system of claim 9, further comprising:
a canister vent valve coupled within a fuel vapor canister vent line between the fuel vapor canister and atmosphere; and wherein
the diaphragm mechanism is coupled to the fuel vapor canister vent line via a second conduit at a second junction.

12. The fuel system of claim 9, further comprising:
a controlling valve configured to regulate the pressure gradient applied across the flexible diaphragm.

13. The fuel system of claim 12, wherein the controlling valve is an actively controlled valve.

14. A method for a fuel system, comprising:
applying a vacuum to a fuel vapor canister side of the fuel system while maintaining closed a fuel tank isolation valve coupled between a fuel tank and a fuel vapor canister to thereby seal the fuel tank and maintain fuel vapor in the fuel tank, the fuel vapor canister side of the fuel system coupled to the fuel tank via a flexible partition comprising a flexible diaphragm and a deflection volume, the vacuum applied to the flexible partition, the flexible diaphragm of the flexible partition configured to deflect outwards from the fuel tank responsive to the vacuum applied from the fuel vapor canister side of the fuel system, thereby increasing a volume of a fuel tank vapor dome; and
indicating degradation of the fuel tank based on a change of fuel tank pressure responsive to the applied vacuum.

* * * * *